(12) United States Patent
Saito et al.

(10) Patent No.: US 12,227,922 B2
(45) Date of Patent: Feb. 18, 2025

(54) WORK MACHINE

(71) Applicant: HITACHI CONSTRUCTION MACHINERY CO., LTD., Tokyo (JP)

(72) Inventors: Yuho Saito, Tokyo (JP); Hidekazu Moriki, Tokyo (JP); Shinya Imura, Tsuchiura (JP); Takaaki Chiba, Tsuchiura (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 224 days.

(21) Appl. No.: 17/912,026

(22) PCT Filed: Feb. 5, 2021

(86) PCT No.: PCT/JP2021/004451
§ 371 (c)(1),
(2) Date: Sep. 15, 2022

(87) PCT Pub. No.: WO2021/192655
PCT Pub. Date: Sep. 30, 2021

(65) Prior Publication Data
US 2023/0137344 A1 May 4, 2023

(30) Foreign Application Priority Data
Mar. 27, 2020 (JP) .................................. 2020-057162

(51) Int. Cl.
*B60R 1/27* (2022.01)
*E02F 9/12* (2006.01)
(Continued)

(52) U.S. Cl.
CPC .............. *E02F 9/262* (2013.01); *E02F 9/123* (2013.01); *E02F 9/24* (2013.01)

(58) Field of Classification Search
None
See application file for complete search history.

(56) References Cited

U.S. PATENT DOCUMENTS 9,333,915 B2 * 5/2016 Nakanishi ................. B60R 1/27
9,454,147 B1 * 9/2016 Friend ...................... E02F 9/265
(Continued)

FOREIGN PATENT DOCUMENTS

EP 2570556 A1 3/2013
JP 5-274035 A 10/1993
(Continued)

OTHER PUBLICATIONS

Extended European Search Report received in corresponding European Application No. 21775959.6 dated Feb. 26, 2024.
(Continued)

*Primary Examiner* — Justin S Lee
(74) *Attorney, Agent, or Firm* — MATTINGLY & MALUR, PC

(57) ABSTRACT

A type of an object is determined and the movement direction of the object is predicted on the basis of a sensing result of the object sensed by an on-machine obstacle sensor. Information relating to the object that is the object sensed by the on-machine obstacle sensor and has been determined to have moved to the outside of a sensing range of the on-machine obstacle sensor is immediately deleted from an environment map on the basis of the type and the movement direction of the object. This can properly process information on the object that has gotten out of the sensing range, according to the cause of the object getting out of the sensing range.

5 Claims, 11 Drawing Sheets

(51) Int. Cl.
*E02F 9/24* (2006.01)
*E02F 9/26* (2006.01)

(56) References Cited

U.S. PATENT DOCUMENTS

| | | | | |
|---|---|---|---|---|
| 11,946,223 | B2* | 4/2024 | Sakuta | E02F 3/435 |
| 2012/0320212 | A1* | 12/2012 | Aimura | G01C 21/3602 |
| | | | | 348/148 |
| 2013/0088593 | A1* | 4/2013 | Ishimoto | E02F 9/226 |
| | | | | 348/143 |
| 2013/0222573 | A1* | 8/2013 | Onuma | E02F 9/24 |
| | | | | 348/82 |
| 2014/0118551 | A1* | 5/2014 | Ikeda | G06T 3/047 |
| | | | | 348/148 |
| 2015/0307024 | A1* | 10/2015 | Fukuda | B60Q 9/008 |
| | | | | 382/103 |
| 2016/0005286 | A1* | 1/2016 | Kiyota | E02F 9/262 |
| | | | | 340/435 |
| 2016/0332574 | A1* | 11/2016 | Park | H04N 7/181 |
| 2016/0344931 | A1* | 11/2016 | Husted | H04N 23/698 |
| 2017/0186319 | A1 | 6/2017 | Tsushima et al. | |
| 2017/0284066 | A1* | 10/2017 | Imaizumi | E02F 9/261 |
| 2018/0080198 | A1* | 3/2018 | Machida | B60K 35/00 |
| 2018/0209122 | A1* | 7/2018 | Kiyota | E02F 9/26 |
| 2018/0245315 | A1* | 8/2018 | Kaiso | G06T 7/70 |
| 2018/0347147 | A1* | 12/2018 | Doi | B60W 30/00 |
| 2019/0004520 | A1 | 1/2019 | Maeno | |
| 2019/0028632 | A1* | 1/2019 | Nobori | H04N 13/122 |
| 2019/0093317 | A1* | 3/2019 | Izumikawa | G06V 20/56 |
| 2019/0218754 | A1* | 7/2019 | Izumikawa | G06V 20/58 |
| 2019/0284782 | A1* | 9/2019 | Izumikawa | F15B 11/10 |
| 2019/0352885 | A1 | 11/2019 | Kurokami et al. | |
| 2020/0010017 | A1* | 1/2020 | Cho | B60R 1/27 |
| 2022/0074171 | A1* | 3/2022 | Izumikawa | G06T 11/00 |

FOREIGN PATENT DOCUMENTS

| | | | | |
|---|---|---|---|---|
| JP | 2007-102488 | A | 4/2007 | |
| JP | 2010-198519 | A | 9/2010 | |
| JP | 2011-150473 | A | 8/2011 | |
| JP | 2018-172857 | A | 11/2018 | |
| JP | 2019-12504 | A | 1/2019 | |
| JP | 2019012504 | A * | 1/2019 | G05D 1/0214 |
| JP | 2020-012323 | A | 1/2020 | |
| WO | 2016/092591 | A1 | 6/2016 | |

OTHER PUBLICATIONS

International Preliminary Report on Patentability received in corresponding International Application No. PCT/JP2021/004451 dated Oct. 6, 2022.
International Search Report of PCT/JP2021/004451 dated Apr. 13, 2021.

* cited by examiner

WORK MACHINE

TECHNICAL FIELD

The present invention relates to a work machine.

BACKGROUND ART

Conventionally, a technique exists in which an environment map is created or deleted based on sensed obstacle information and machine body operation is controlled according to information on the created environment map.

For example, in patent document 1, autonomous moving apparatus is disclosed that includes an obstacle sensing section that senses an obstacle, a map creating section that records information of the obstacle sensed by the obstacle sensing section on an environment map, an obstacle erasing section that erases the information of the obstacle recorded by the map creating section from the environment map according to the elapse of time, and a route determining section that sets a movement route on the basis of the information recorded on the environment map.

PRIOR ART DOCUMENT

Patent Document

Patent Document 1: JP-2019-12504-A

SUMMARY OF THE INVENTION

Problem to be Solved by the Invention

In the above-described conventional technique, regarding an obstacle outside the sensing range of the on-machine obstacle sensing section, information of the obstacle is deleted from the environment map according to the time when the obstacle has been sensed and the number of times of the sensing and the deletion speed is adjusted. However, the cause of the obstacle getting out of the sensing range is not necessarily sufficiently considered, and contact between the autonomous moving apparatus and the obstacle is of concern when the obstacle has gotten out of the sensing range due to the entry of the obstacle into the blind area of the on-machine obstacle sensing section. Furthermore, because it is impossible to identify the cause of the obstacle getting out of the sensing range, it is also conceivable that the plan of an avoidance route made in consideration of the obstacle that has gotten out of the sensing range becomes excessive regarding the movement route of the autonomous moving apparatus.

The present invention is made in view of the above and intends to provide a work machine that can properly process information on an object that has gotten out of a sensing range according to the cause thereof.

Means for Solving the Problem

The present application includes plural means to solve the above-described problem. To cite one example thereof, in a work machine including a machine body having a moving device, a work device disposed on the machine body, a plurality of actuators that cause the moving device and the work device to operate, an object sensor that senses an object around the machine body, and a controller configured to create an environment map including information relating to an object that exists around the machine body on the basis of information on an object sensed by the object sensor and cause the plurality of actuators to operate on the basis of the environment map created, the controller is configured to determine a type of the object and predict a movement direction of the object on the basis of a sensing result of the object sensed by the object sensor and delete, from the environment map, the information relating to the object that is the object sensed by the object sensor and has been determined to have moved to the outside of a sensing range of the object sensor on the basis of the type and the movement direction of the object.

Advantages of the Invention

According to the present invention, the information on the object that has gotten out of the sensing range can be properly processed according to the cause thereof.

MODES FOR CARRYING OUT THE INVENTION

Embodiments of the present invention will be described below with reference to the drawings. In embodiments of the present invention, description will be made by exemplifying a hydraulic excavator including a front work implement (work device) as a work machine. However, the present invention can be applied also to other work machines including a work device, such as wheel loaders and cranes.

First Embodiment

A first embodiment of the present invention will be described with reference to FIG. 1 to FIG. 10.

Figure 1:
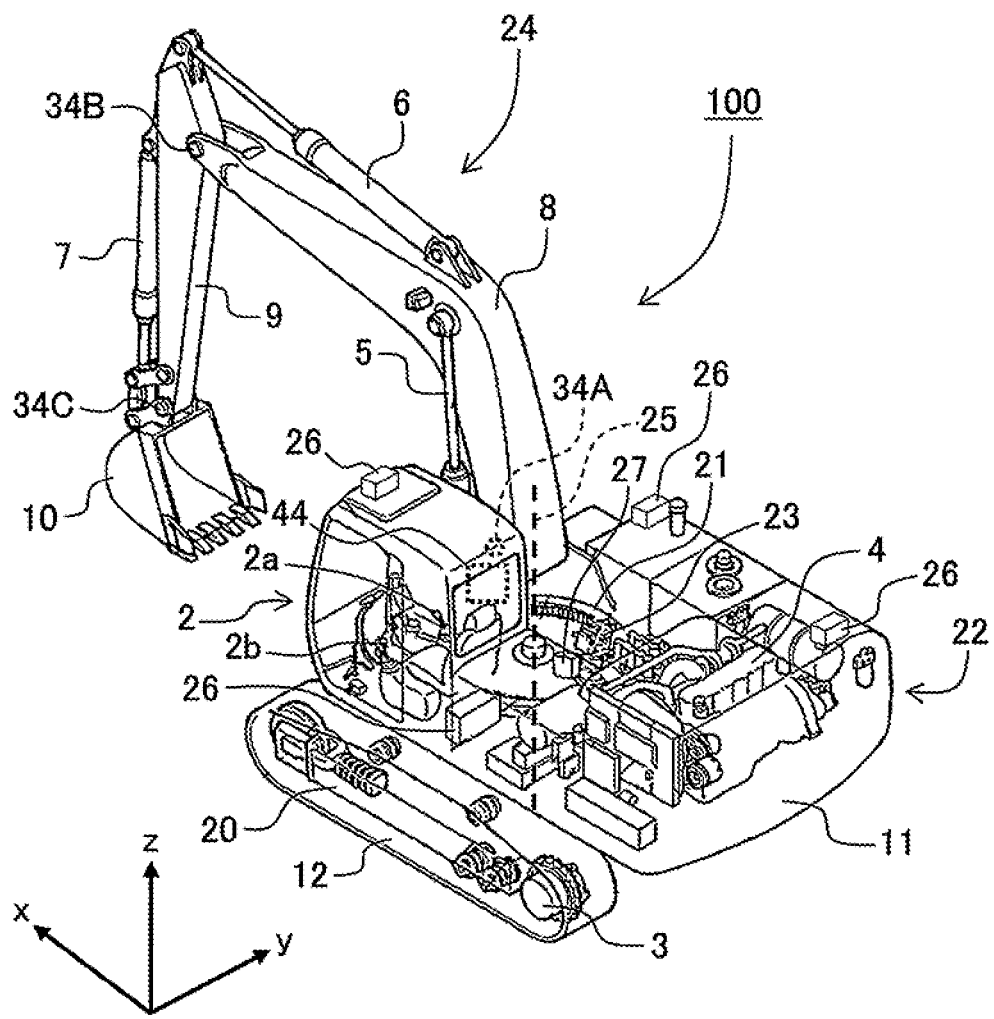
FIG. 1 is a perspective view schematically illustrating the appearance of a hydraulic excavator that is one example of a work machine according to a first embodiment.
Figure 2:
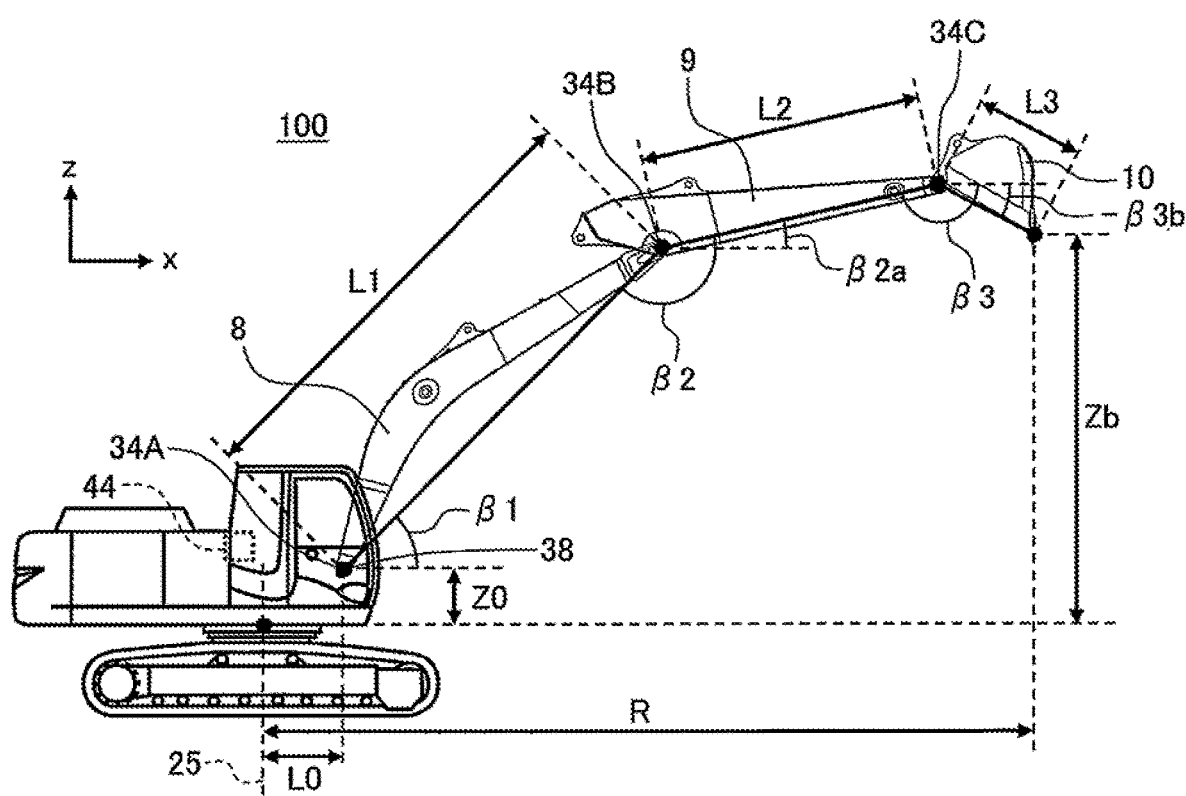
FIG. 2 is a side view schematically illustrating the appearance of the hydraulic excavator.
Figure 3:
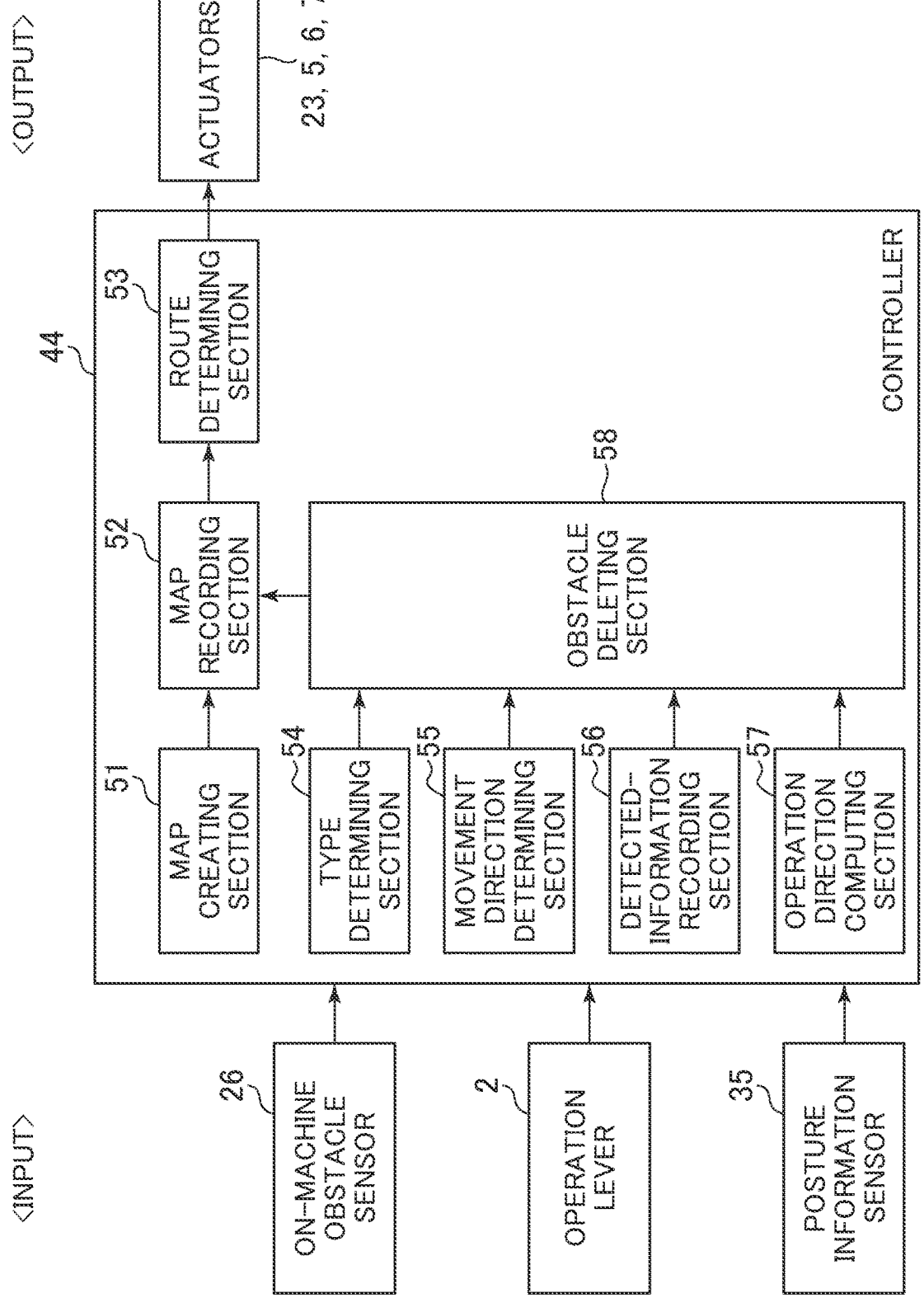
FIG. 3 is a functional block diagram schematically illustrating part of processing functions of a controller mounted in the hydraulic excavator.

FIG. 1 is a perspective view schematically illustrating the appearance of a hydraulic excavator that is one example of the work machine according to the present embodiment and FIG. 2 is a side view. Furthermore, FIG. 3 is a functional block diagram schematically illustrating part of processing functions of a controller mounted in the hydraulic excavator.

In FIG. 1 and FIG. 2, a hydraulic excavator 100 includes an articulated front work implement 24 configured by linking plural driven components (boom 8, arm 9, and bucket (work equipment) 10) to each other that each pivot in the perpendicular direction, and an upper swing structure 22 and a lower track structure 20 that configure the machine body. The upper swing structure 22 is disposed swingably relative to the lower track structure 20 through a swing mechanism 21. The swing mechanism 21 has a swing motor 23 and a machine body swing angle sensor 27. The upper swing structure 22 is driven to swing relative to the lower track structure 20 by the swing motor 23 and the swing angle with respect to the lower track structure 20 is sensed by the machine body swing angle sensor 27.

The base end of the boom 8 of the front work implement 24 is supported by the front part of the upper swing structure 22 pivotally in the perpendicular direction. One end of the arm 9 is supported by the end part (tip) different from the base end in the boom 8 pivotally in the perpendicular direction. The bucket 10 is supported by the other end of the arm 9 pivotally in the perpendicular direction. The boom 8, the arm 9, the bucket 10, the upper swing structure 22, and the lower track structure 20 are driven by a boom cylinder 5, an arm cylinder 6, a bucket cylinder 7, the swing motor 23, and left and right travelling motors 3 (only one travelling motor is illustrated), respectively, that are hydraulic actuators.

Here, the intersection of a swing center axis 25 of the upper swing structure 22 and the lower surface of the upper swing structure 22 is defined as the origin, and a machine body coordinate system is set that has a z-axis that is along the swing center axis 25 and along which the upper side is the positive side, an x-axis that extends from the origin in the forward-rearward direction perpendicular to the z-axis and along which the front side is the positive side, and a y-axis that extends from the origin in the left-right direction perpendicular to the z-axis and the x-axis and along which the right direction is the positive side.

A cab 2 on which an operator gets is mounted on the front left side of the upper swing structure 22.

Furthermore, a controller 44 that controls operation of the whole of the hydraulic excavator 100 is disposed on the upper swing structure 22. In the cab 2, operation levers (operation devices) 2a and 2b that output an operation signal for operating the hydraulic actuators 5 to 7 and 23 are disposed. Although not illustrated, the operation levers 2a and 2b can each be inclined forward, rearward, leftward, and rightward, and include a sensor that electrically detects the inclination amount of the lever that is the operation signal, i.e. the lever operation amount, and is not illustrated in the diagram, and output the lever operation amount sensed by the sensor to the controller 44 (described later) through electrical wiring. That is, operations of the hydraulic actua-tors 5 to 7 and 23 are each assigned to the forward-rearward direction or the left-right direction of the operation lever 2a or 2b.

Operation control of the boom cylinder 5, the arm cylinder 6, the bucket cylinder 7, the swing motor 23, and the left and right travelling motors 3 is carried out by controlling, control valves or, the direction and the flow rate of a hydraulic operating fluid supplied to the respective hydraulic actuators 3, 5 to 7, and 23 from a hydraulic pump device driven by a prime mover such as an engine or electric motor that is not illustrated in the diagram. Operation of the control valves is controlled by the controller 44 on the basis of the operation signal from the operation lever 2a or 2b and thereby operation of the respective hydraulic actuators 5 to 7 and 23 is controlled.

Posture sensors 34A, 34B, and 34C are attached to the base part of the boom 8, the connecting part between the boom 8 and the arm 9, and the connecting part between the arm 9 and the bucket 10, respectively. The posture sensors 34A, 34B, and 34C are mechanical angle sensors like a potentiometer, for example. As illustrated in FIG. 2, the posture sensor 34A measures an angle $\beta 1$ formed by the longitudinal direction (straight line that links the pivot centers of both ends to each other) of the boom 8 and the x-y plane and transmits the angle $\beta 1$ to the controller 44. Furthermore, the posture sensor 34B measures an angle $\beta 2$ formed by the longitudinal direction (straight line that links the pivot centers of both ends to each other) of the boom 8 and the longitudinal direction (straight line that links the pivot centers of both ends to each other) of the arm 9 and transmits the angle $\beta 2$ to the controller 44. Moreover, the posture sensor 34C measures an angle $\beta 3$ formed by the longitudinal direction (straight line that links the pivot centers of both ends to each other) of the arm 9 and the longitudinal direction (straight line that links the pivot center and the claw tip to each other) of the bucket 10 and transmits the angle $\beta 3$ to the controller 44. Here, the machine body swing angle sensor 27 and the posture sensors 34A to 34C configure a posture information sensor 35 that senses posture information of the upper swing structure 22 and the front work implement 24.

In the present embodiment, description will be made by exemplifying the case in which a rocking center 38 (connecting part with the upper swing structure 22 in the boom 8) of the front work implement 24 is disposed at a different position from the swing center axis 25. However, the swing center axis 25 and the rocking center 38 may be disposed to intersect.

Furthermore, in the present embodiment, description has been made by exemplifying the case in which angle sensors and so forth are used as the posture information sensor 35. However, inertial measurement devices (IMU: Inertial Measurement Unit) may be used as the machine body swing angle sensor 27 and the posture sensors 34A to 34C. Moreover, the configuration may be made in such a manner that a stroke sensor is disposed for each of the boom cylinder 5, the arm cylinder 6, and the bucket cylinder 7 and the relative orientation (posture information) at the respective connecting parts of the upper swing structure 22, the boom 8, the arm 9, and the bucket 10 is figured out from the stroke change amount and each angle is obtained from the result thereof.

On the upper swing structure 22, plural (for example, four) on-machine obstacle sensors 26 that sense an object around the machine body (upper swing structure 22, lower track structure 20) are disposed. The installation positions and the number of on-machine obstacle sensors 26 are not particularly limited to the example of the present embodiment and it suffices that the field of view of all directions of the machine body (that is, 360 degrees around the hydraulic excavator 100) can be ensured. In the present embodiment, description will be made by exemplifying the case in which the four on-machine obstacle sensors 26 are each installed at the upper part of the cab 2 and the left lateral side, the front part on the right lateral side, and the rear part on the right lateral side in the upper swing structure 22 and cover the field of view of 360 degrees around the machine body. The on-machine obstacle sensors 26 are sensors using a LiDAR (Laser Imaging Detection and Ranging, laser image detection and ranging) technique for example, and sense an object that exists around the hydraulic excavator 100 and transmit coordinate data thereof to the controller 44.

A front work implement length R illustrated in FIG. 2 is a distance R from the swing center axis 25 to the tip of the front work implement 24. The lengths of the boom 8, the arm 9, and the bucket 10 are defined as L1, L2, and L3, respectively. The angle β1 formed by the x-y plane and the longitudinal direction of the boom 8 is measured by the posture sensor 34A. The angle β2 formed by the boom 8 and the arm 9 and the angle β3 formed by the arm 9 and the bucket 10 are measured by the posture sensors 34B and 34C, respectively. A height Z0 from the x-y plane to the rocking center 38 is obtained in advance. Furthermore, a distance L0 from the swing center axis 25 to the rocking center 38 is also obtained in advance. An angle β2a formed by the xy plane and the longitudinal direction of the arm 9 can be calculated from the angle β1 and the angle β2. An angle β3b formed by the xy plane and the longitudinal direction of the bucket 10 can be calculated from the angle β1 and the angles 82 and 83. That is, the front work implement length R can be calculated by the following (expression 1).

$$R = L0 + L1 \cos\beta1 + L2 \cos\beta2a + L3 \cos\beta3b \qquad \text{(expression 1)}$$

In FIG. 3, the controller 44 includes a map creating section 51, a map recording section 52, a route determining section 53, a type determining section 54, a movement direction determining section 55, a detected-information recording section 56, an operation direction computing section 57, and an obstacle deleting section 58.

The map creating section 51 creates an environment map including information on an object that exists around the machine body on the basis of position information of the object (obstacle) sensed by the on-machine obstacle sensor 26 and transmits the created environment map to the map recording section 52. The obstacle in the present embodiment is an object that exists around the machine body and is an object excluding the ground. For example, the obstacle is a moving object such as another work machine or a worker or is an object such as a building or a rock with a size larger than a certain size or is a fixed object such as a sign.

The type determining section 54 determines the type of the obstacle sensed by the on-machine obstacle sensor 26 and transmits the determination result to the obstacle deleting section 58. In the determination of the type in the type determining section 54, for example, by using a pattern matching technique such as image recognition for an image obtained in the on-machine obstacle sensor 26 to compare the image with images of objects that are prepared in advance and whose type has been selected, the type of the most similar object is determined as the type of the obstacle sensed by the on-machine obstacle sensor 26.

The movement direction determining section 55 determines, on the basis of position information and sensed orientation of the object sensed by the on-machine obstacle sensor 26, whether or not the movement direction in which the object (obstacle) is expected to move is a blind area (described later) from the movement direction and the movement speed. Then, the movement direction determining section 55 transmits the determination result to the obstacle deleting section 58. In the discrimination of the movement direction in the movement direction determining section 55, the distance of the movement, the movement speed, and the orientation (movement direction) are computed from the difference between the position of the object sensed at a time (t−1) and the position of the same object sensed at a time (t), for example.

The detected-information recording section 56 records the position of the obstacle sensed by the on-machine obstacle sensor 26, the sensing time, the sensed orientation, and the position of the on-machine obstacle sensor 26 that has sensed the obstacle and transmits these pieces of information to the obstacle deleting section 58.

The operation direction computing section 57 computes the operation directions of the front work implement 24 (bucket (work equipment) 10) and the machine body (upper swing structure 22, lower track structure 20) on the basis of information on the front work implement length R and the swing angle computed by the posture information sensor 35 and transmits the computation result to the obstacle deleting section 58. In the computation of the operation directions in the operation direction computing section 57, the operation directions of the front work implement 24 and the machine body are computed from the difference between information of the previous step in the unit processing time in the controller 44 and the present information, for example.

The map recording section 52 records the environment map created by the map creating section 51. Furthermore, the map recording section 52 deletes, from the environment map, information of the obstacle about which a deletion request has been received from the obstacle deleting section 58.

The obstacle deleting section 58 decides information of the obstacle to be deleted from the environment map on the basis of information obtained from the type determining section 54, the movement direction determining section 55, the detected-information recording section 56, and the operation direction computing section 57 and transmits a request to delete the information of the obstacle to the map recording section 52.

The route determining section 53 refers to the environment map recorded in the map recording section 52 and corrects a route input through operating the operation lever 2a, 2b by an operator or computes the movement route to the target position, and outputs an operation command to the actuator 5 to 7 and 23.

In the present embodiment configured as above, the controller 44 executes object information deletion processing in which the controller 44 computes the operation directions of the machine body and the front work implement 24 on the basis of posture information sensed by the posture information sensor 35 and determines the type of an object and predicts the movement direction of the object on the basis of the sensing result of the object sensed by the on-machine obstacle sensor 26 and immediately deletes, from the environment map, information relating to the object that is the object sensed by the on-machine obstacle sensor 26 and has moved to the outside of the sensing range of the on-machine obstacle sensor 26 on the basis of the operation directions of the machine body and the front work implement 24 and the type and the movement direction of the object.

Figure 4:
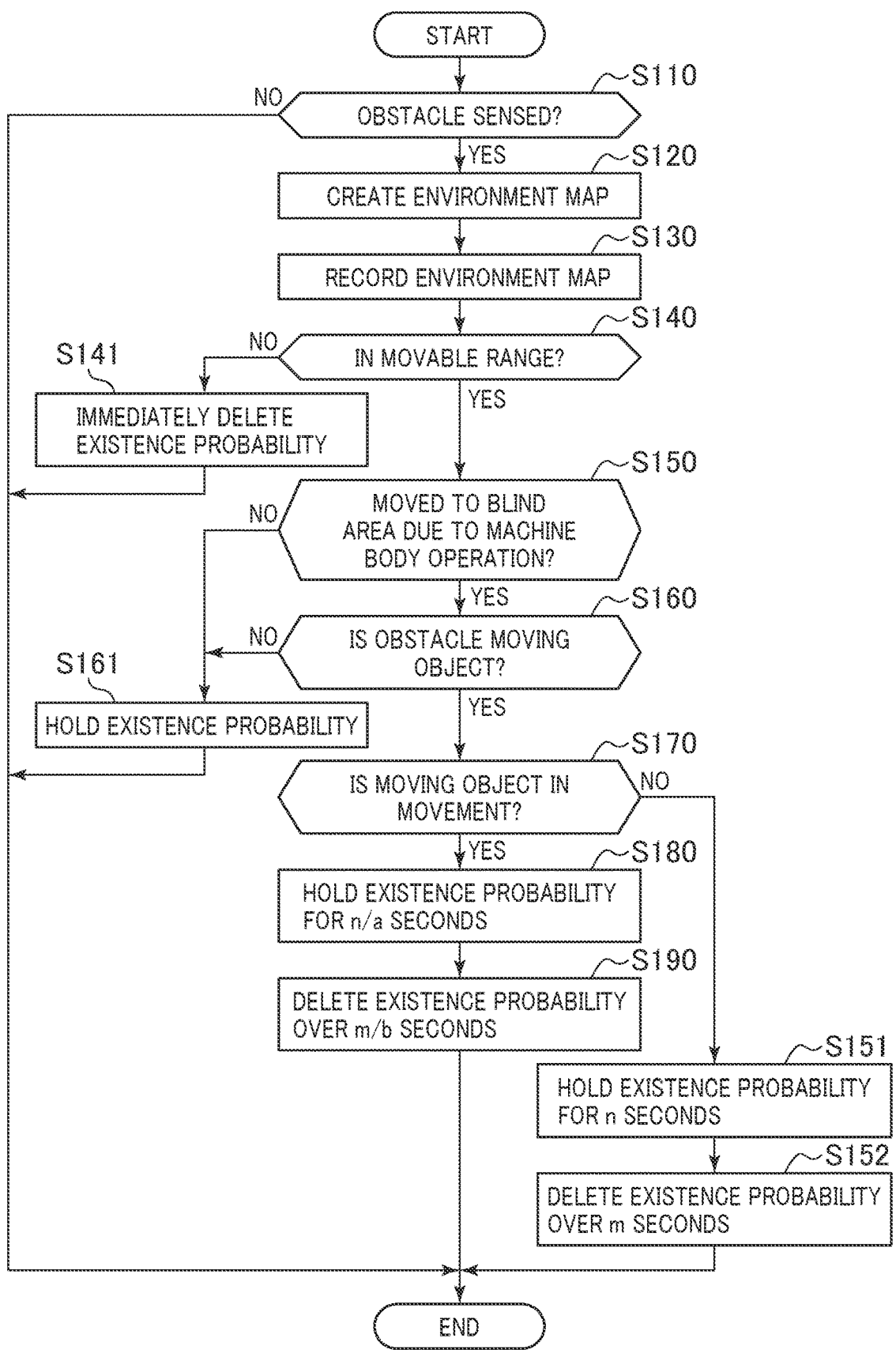
FIG. 4 is a flowchart illustrating the processing contents of object information deletion processing in the controller.

FIG. 4 is a flowchart illustrating the processing contents of the object information deletion processing in the controller. The processing to be described below is executed for each obstacle.

In FIG. 4, the controller 44 determines whether or not an obstacle has been sensed by the on-machine obstacle sensor 26 (step S110), and ends the processing when the determination result is NO, that is, when an obstacle has not been sensed.

Furthermore, when the determination result in the step S110 is YES, that is, when an obstacle has been sensed by the on-machine obstacle sensor 26, the controller 44 creates an environment map by the map creating section 51 (step S120) and records the created environment map by the map recording section 52 (step S130). In the environment map recorded in the map recording section 52, information on an obstacle included in an environment map newly created by the map creating section 51 is accumulated and recorded.

Figure 5:
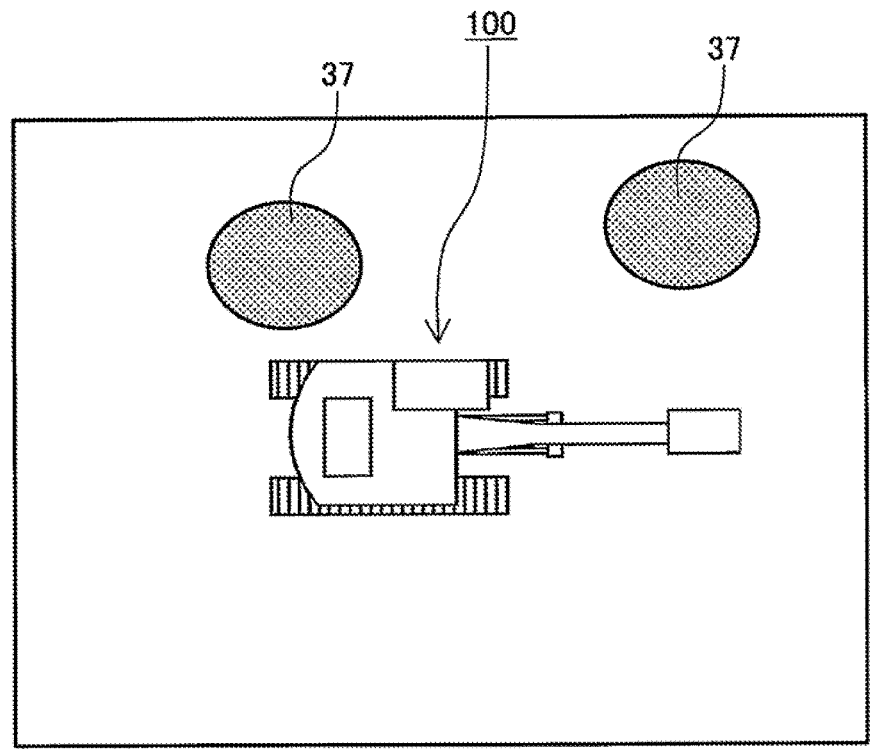
FIG. 5 is a diagram illustrating one example of an environment map.
Figure 6:
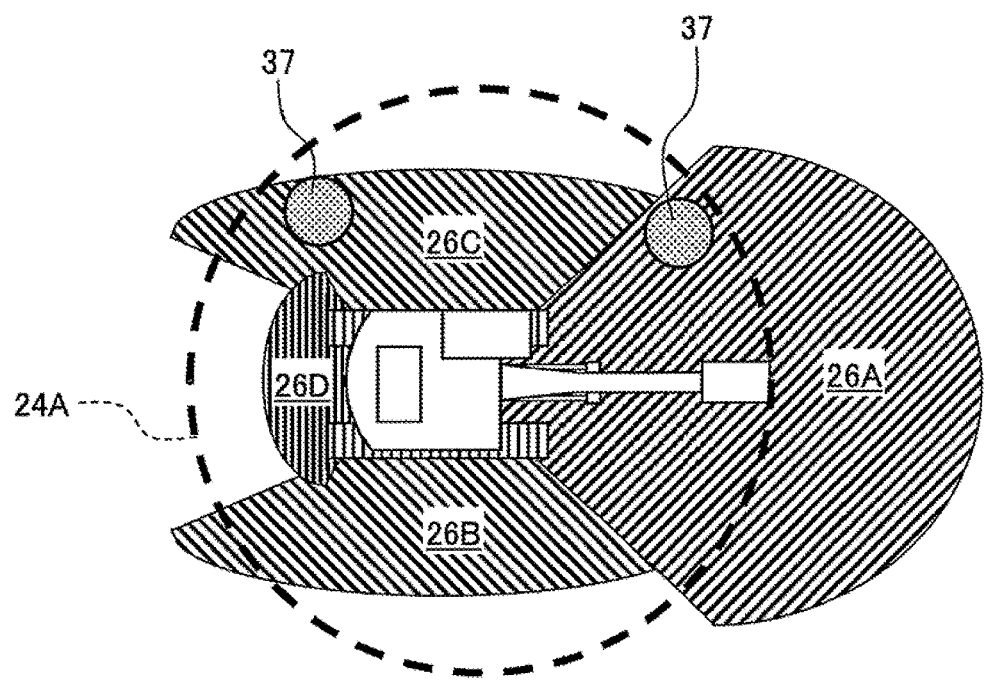
FIG. 6 is a top view schematically illustrating the state of surroundings of a machine body corresponding to the environment map illustrated in FIG. 5.

FIG. 5 is a diagram illustrating one example of the environment map. Moreover, FIG. 6 is a top view schematically illustrating the state of surroundings of the machine body corresponding to the environment map illustrated in FIG. 5.

As illustrated in FIG. 5, the environment map is created based on the coordinates, the shape, and the reliability of information regarding obstacles 37 obtained by the on-machine obstacle sensors 26. Furthermore, as illustrated in FIG. 6, information of the obstacles 37 sensed in sensing ranges 26A to 26D of the on-machine obstacle sensors 26 is recorded on the environment map. In the present embodiment, the outside of the sensing ranges 26A to 26D of the on-machine obstacle sensors 26, i.e. the range in which sensing is impossible, is referred to as the blind area.

The environment map is what is obtained by recording the existence probabilities of the obstacle 37 at positions corresponding to the respective lattice points in the case in which a lattice of 10 cm×10 cm is set around the machine body as the values of the respective lattice points. The existence probability of the obstacle 37 recorded on the environment map is decided depending on the reliability of information and the shape when the obstacle 37 is sensed by the on-machine obstacle sensor 26. That is, regarding the existence probability of the obstacle 37, the existence probability at the center position thereof is the highest (for example, existence probability=100%) and the existence probability gradually decreases in the radial direction as the position gets farther away from the center position and the state in which the obstacle 37 does not exist (for example, existence probability=0%) is obtained at a certain distance.

The environment map may be used in a contact prevention function to prevent contact with an obstacle and a movement route planning function to compute the movement route to the target position with avoidance of obstacles, for example. That is, for example, the route determining section 53 estimates positions at which the possibility of existence of an obstacle is high based on the existence probability of the obstacle in the environment map, and determines the route on which the existence probability of the obstacle is the lowest from the present position of the bucket 10 to the target position, and outputs instruction signals to the actuators 23, 5, 6, and 7 to cause the bucket 10 to move along the route. Furthermore, it is also possible to display the environment map to the operator or use the environment map for processing of alleviating collision based on the existence probability of the obstacle 37 and so forth also at the time of manual and semiautomatic operation. In FIG. 5, the existence probability of the obstacle 37 in the environment map is represented by one kind of hatching for convenience. However, for example, in the case of presentation to the operator, the existence probability may be represented by a color scheme in which the existence probability becomes higher as the color becomes darker and the existence probability becomes lower as the color becomes paler.

Referring back to FIG. 4, when the processing of the step S130 ends, subsequently the controller 44 determines whether or not the obstacle 37 is in the movable range (step S140). When the determination result is NO, that is, when the obstacle 37 has been sensed outside the movable range, a deletion instruction is transmitted to the map recording section 52 to immediately delete the information (existence probability) relating to the obstacle 37 from the environment map (step S141), and the processing is ended.

Figure 7:
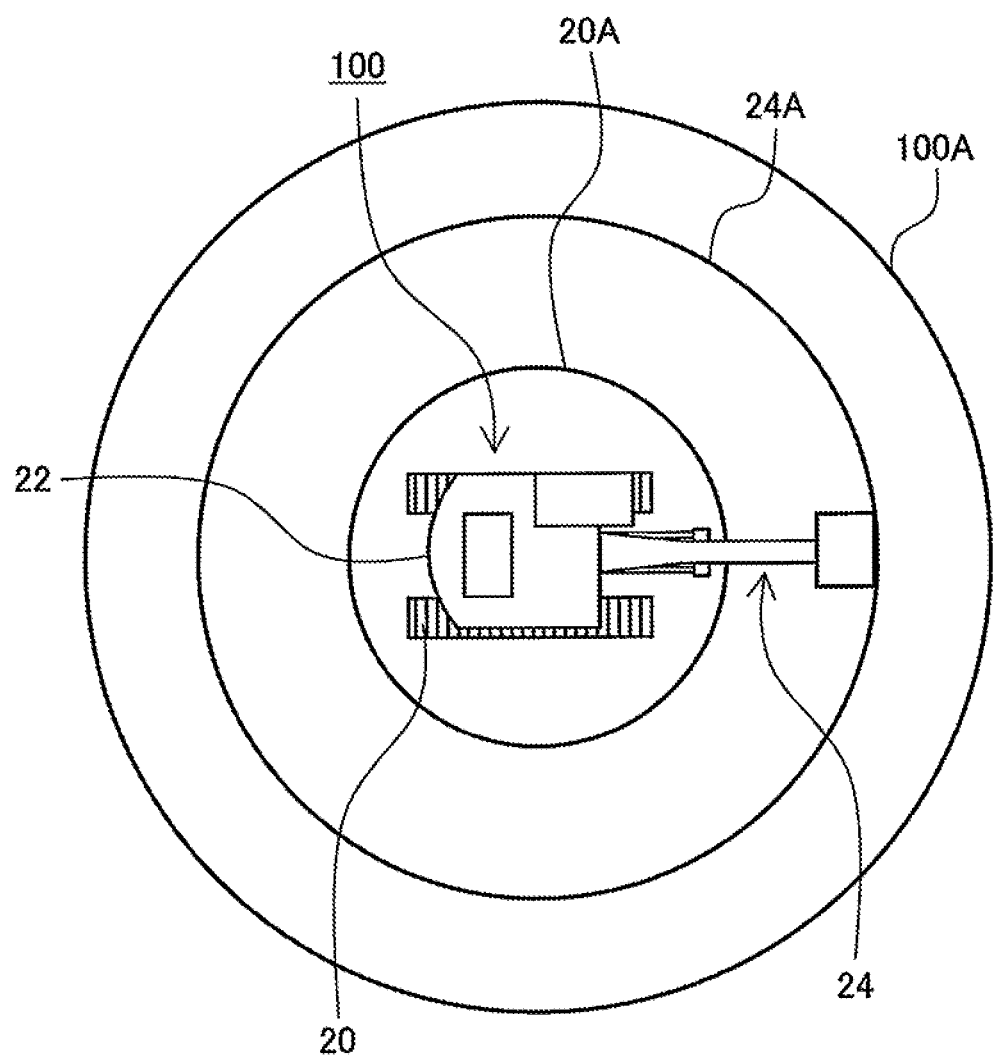
FIG. 7 is a diagram illustrating the movable range of the hydraulic excavator that is the work machine.

FIG. 7 is a diagram illustrating the movable range of the hydraulic excavator that is the work machine.

In FIG. 7, a movable range 24A relating to the front work implement 24 of the hydraulic excavator 100 is the range that can be reached by the front work implement 24 when the upper swing structure 22 swings by 360 degrees in the case in which the posture with which the front work implement length R is the longest is taken. Furthermore, a movable range 20A relating to the lower track structure 20 is the range that can be reached by the machine body in e.g. T seconds at the time of travelling of the hydraulic excavator 100. Moreover, the movable range obtained by integrating the movable ranges 20A and 24A is defined as a movable range 100A relating to the hydraulic excavator 100.

Referring back to FIG. 4, when the determination result in the step S140 is YES, the controller 44 determines whether or not the obstacle has moved to the blind area due to machine body operation (step S150). When the determination result in the step S150 is NO, the controller 44 holds the information (existence probability) relating to the obstacle 37 in the environment map (step S161) and ends the processing.

Furthermore, when the determination result in the step S150 is YES, the controller 44 determines whether or not the obstacle is a moving object (step S160). When the determination result in the step S160 is NO, the controller 44 holds the information (existence probability) relating to the obstacle 37 in the environment map (step S161) and ends the processing.

Moreover, when the determination result in the step S160 is YES, the controller 44 determines whether or not the obstacle (moving object) is in movement (step S180). When the determination result in the step S170 is YES, the controller 44 holds the existence probability of the obstacle for n/a seconds (step S151) and thereafter deletes the existence probability (that is, decreases the existence probability to 0 (zero)) over a time of m/b seconds (step S190) and ends the processing. Furthermore, when the determination result in the step S170 is NO, the controller 44 proceeds to processing of a step S151.

Here, the above-described processing will be described in more detail.

Figure 8:
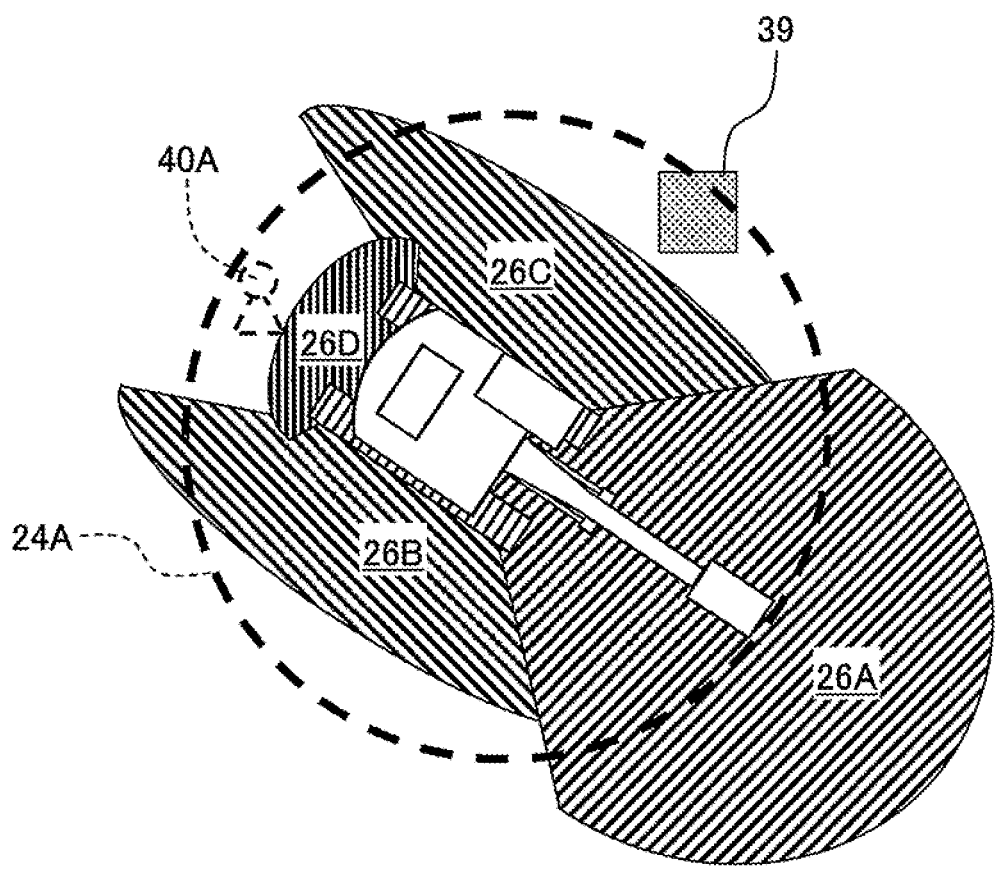
FIG. 8 is a diagram for explaining generation of the environment map when the machine body has swung and a deletion determination method of information of the obstacle.

FIG. 8 is a diagram for explaining generation of the environment map when the machine body has swung and a deletion determination method of information of the obstacle.

For example, when the machine body swings and an obstacle in the movable range 24A gets out of the sensing ranges 26A to 26D of the on-machine obstacle sensors 26 in the state in which the obstacle (obstacle 37 in FIG. 6, fixed object 39 or moving object 40A in FIG. 8, or the like) is not moving, the existence probability is held irrespective of the type of the obstacle. On the other hand, regarding the obstacle outside the movable range 24A, the existence probability is immediately deleted irrespective of the type of the obstacle.

Furthermore, when the machine body stops at the movement destination for a certain time, for example n seconds, and has not carried out swing operation, whether to delete the existence probability is determined according to the type of the obstacle. For example, suppose that obstacles are classified into an obstacle that moves (moving object 40A) and a fixed obstacle (fixed object 39). Suppose that the moving object 40A mainly represents a worker or another machine and the fixed object 39 represents a column, wall, cone, or the like.

The possibility that the fixed object 39 moves from a position at which the fixed object 39 was sensed in the past is low even after the elapse of n seconds, and therefore, the existence probability does not need to be deleted even when the fixed object 39 gets out of the sensing ranges 26A to 26D. On the other hand, the possibility that the moving object 40A has moved from a position at which the moving object 40A was sensed in the past after n seconds is high. If the existence probability of the moving object 40A with a high possibility of movement from the position at which it was sensed is kept, there is a possibility that it is impossible to generate an efficient route at the time of route planning. Thus, for the moving object 40A after the elapse of n seconds, the existence probability is deleted. Here, for example the n seconds is set equal to or longer than the time over which an average operator operates the hydraulic excavator 100 to carry out excavating and loading operation.

Moreover, the moving object 40A after the elapse of n seconds is discriminated and the existence probability is gradually lowered and is completely deleted after m seconds. The m seconds is decided according to the original existence probability and the distance from the machine body regarding the moving object 40A. For example, the moving object 40A that exists at a position separate from the machine body, such as the outside of the movable range 24A of the hydraulic excavator 100, has a low risk of contact with the machine body, and therefore the deletion speed is set faster. On the other hand, the moving object 40A that exists in the vicinity of the machine body, such as the inside of the movable range 24A of the hydraulic excavator 100, has a high risk of contact with the machine body, and therefore the speed of the deletion is set slower.

Furthermore, for example, regarding the moving object 40A with a low existence probability, the possibility that the moving object 40A exists at a sensing position after n seconds is extremely low, and therefore the deletion speed is set faster. On the other hand, for example, regarding the moving object 40A with a high existence probability, the possibility that the moving object 40A exists near a sensing position after n seconds remains, and therefore the deletion speed is set slower.

When the same obstacle 37 is sensed by the different on-machine obstacle sensors 26 for example, deletion determination is carried out with priority given to information with higher reliability. Moreover, when the reliability of information of the obstacle 37 is low and it is difficult to determine the type of the obstacle 37, the obstacle 37 is treated as the moving object 40A.

Figure 9:
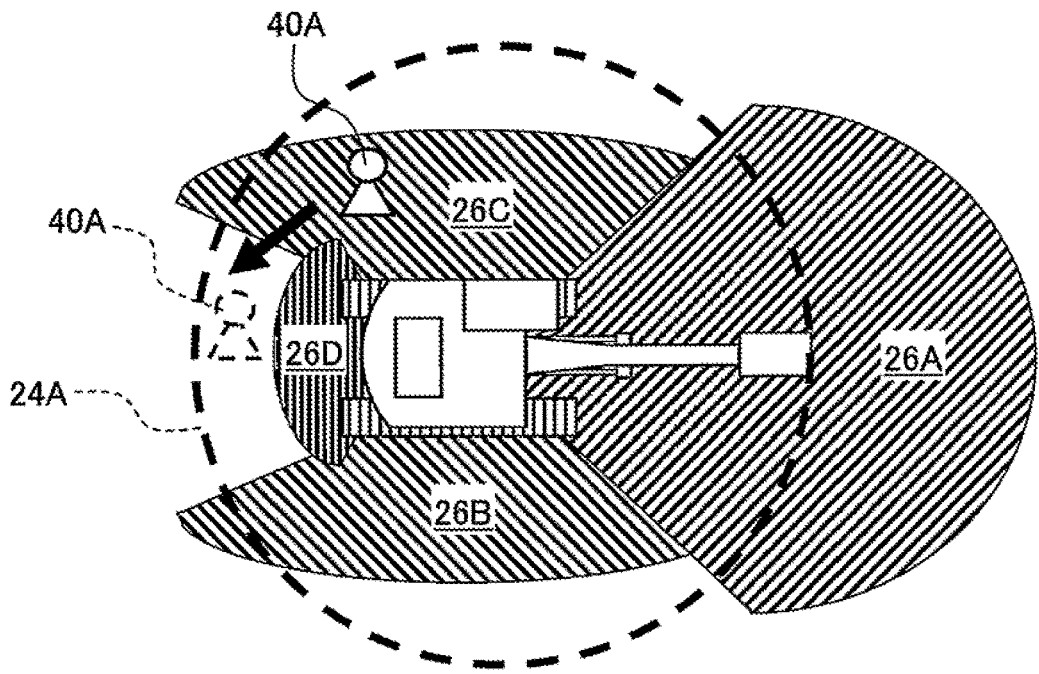
FIG. 9 is a diagram for explaining the deletion determination method of obstacle information when a moving object has moved to a blind area in the state in which the machine body has stopped.
Figure 10:
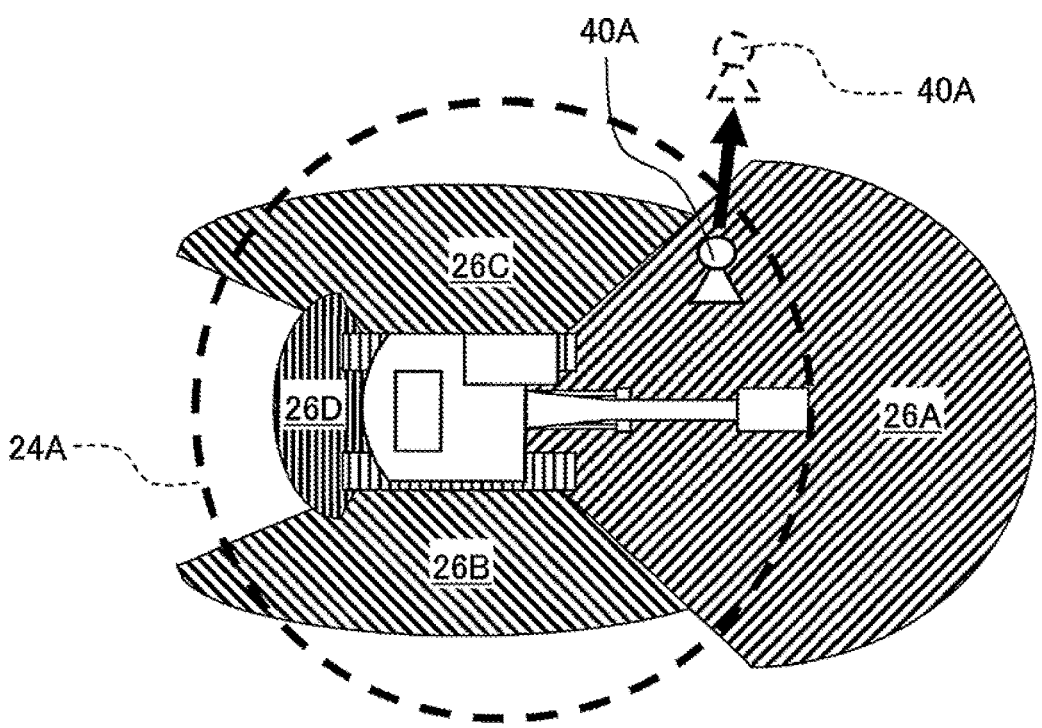
FIG. 10 is a diagram for explaining the deletion determination method of the obstacle information when the moving object has moved to the blind area in the state in which the machine body has stopped.

FIG. 9 and FIG. 10 are diagrams for explaining the deletion determination method of obstacle information when a moving object has moved to the blind area in the state in which the machine body has stopped.

In FIG. 9, for example, when the moving object 40A has moved to the blind area in a gap between the sensing ranges by oneself, the existence probability is held for n seconds and is gradually deleted according to the elapse of time. On the other hand, in FIG. 10, regarding the moving object 40A that moves to the outside of the movable range 24A of the hydraulic excavator 100, the risk of collision with the machine is low, and therefore the existence probability of the obstacle 37 is immediately deleted.

When the machine body carries out swing action (see FIG. 7) and the moving object 40A moves by oneself to move to the outside of the sensing range (see FIG. 8), the operation direction of the machine body is computed in the operation direction computing section 57 and the obstacle deleting section 58 computes the deletion speed of the existence probability from the movement direction of the moving object 40A and the machine body operation direction obtained from the movement direction determining section 55 and the operation direction computing section 57. For example, when the moving object 40A moves in a direction toward the outside of the movable range 24A and has moved to the blind area due to swing operation of the machine body before having moved to the outside of the sensing range, it is determined that the moving object 40A is attempting to get farther away from the machine body, and the existence probability is held for n/a seconds and is deleted over m/b seconds. The variables a and b are adjustment values equal to or larger than 1 and vary according to the positions of the machine body and the moving object 40A sensed last, and the values become larger as the moving object 40A is remoter from the machine body. Furthermore, for example, when the moving object 40A moves in a direction toward the blind area and has moved to the blind area due to swing operation of the machine body before having moved to the outside of the sensing range, the existence probability is held for n seconds and is deleted after m seconds as described above.

Effects of the present embodiment configured as above will be described.

In the conventional technique, regarding an obstacle outside the sensing range of the on-machine obstacle sensing section, information of the obstacle is deleted from the environment map according to the time when the obstacle has been sensed, and the number of times of the sensing and the deletion speed is adjusted. However, the cause of the obstacle getting out of the sensing range is not necessarily sufficiently considered, and contact between the machine body and the obstacle is of concern when the obstacle has gotten out of the sensing range due to the entry of the obstacle into the blind area of the on-machine obstacle sensing section. Furthermore, because it is impossible to identify the cause of the obstacle getting out of the sensing range, it is also conceivable that the plan of an avoidance route made in consideration of the obstacle that has gotten out of the sensing range becomes excessive regarding the movement route of the machine body.

In contrast, in the present embodiment, the configuration is made in such a manner that the operation directions of the machine body and the work device are computed based on the posture information sensed by the posture information sensor 35 and the type of an object is determined and the movement direction of the object is predicted based on the sensing result of the object sensed by the on-machine obstacle sensor 26 and information relating to the object that is the object sensed by the object sensor and has moved to the outside of the sensing range of the on-machine obstacle sensor 26 is immediately deleted from the environment map on the basis of the operation directions of the machine body and the work device and the type and the movement direction of the object. Therefore, the information on the object that has gotten out of the sensing range can be properly processed according to the cause thereof, and improvement in the work efficiency can be intended while lowering of the safety is suppressed.

Second Embodiment

A second embodiment of the present invention will be described with reference to FIG. 11 and FIG. 12.

In the first embodiment, the case in which an object (obstacle) is sensed by using the on-machine obstacle sensors 26 is illustrated. The present embodiment is what illustrates the case in which an object (obstacle) is sensed also in other obstacle sensors (environmental obstacle sensors 41).

Figure 11:
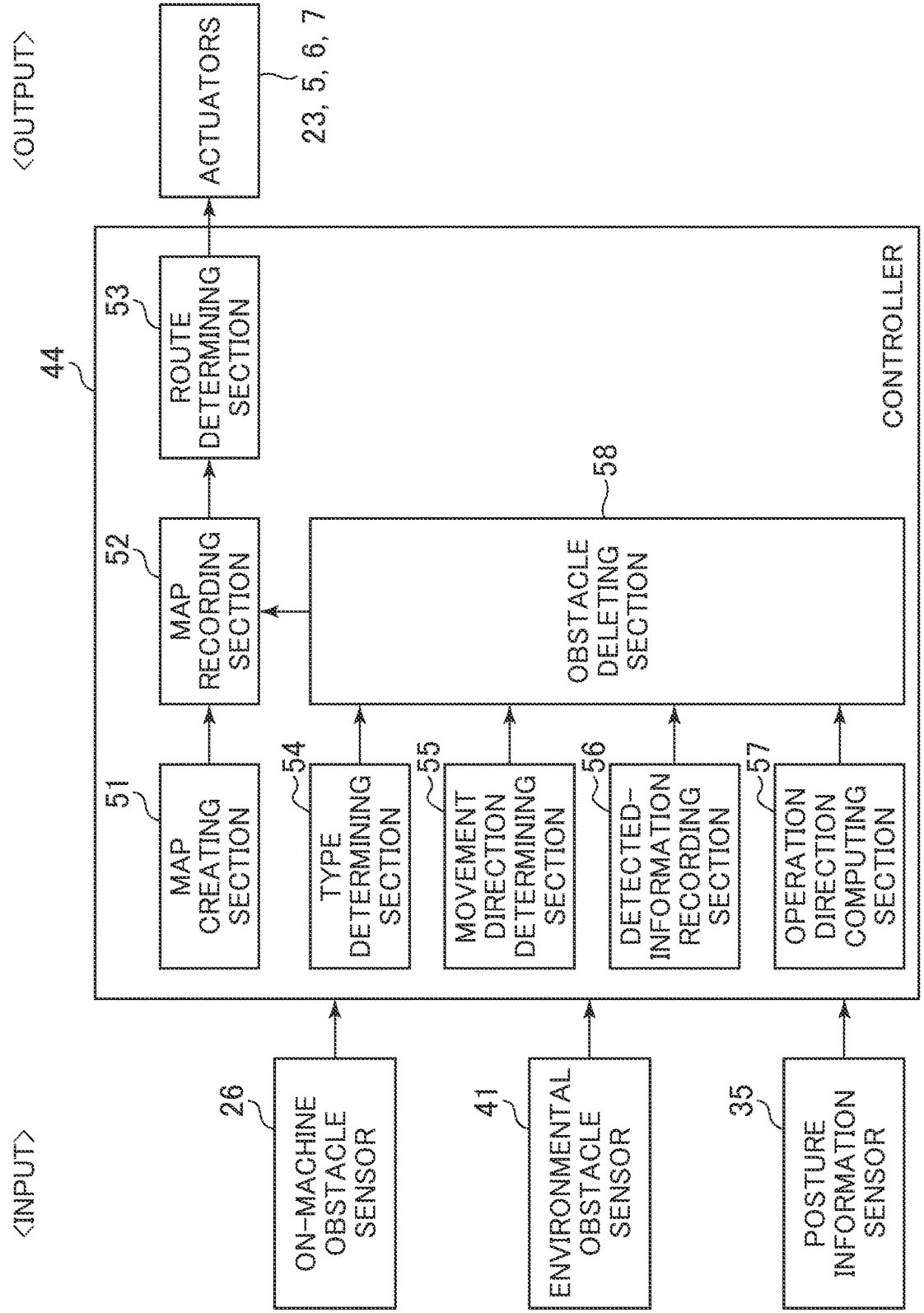
FIG. 11 is a functional block diagram schematically illustrating part of processing functions of the controller mounted in the hydraulic excavator in a second embodiment.

FIG. 11 is a functional block diagram schematically illustrating part of processing functions of the controller mounted in the hydraulic excavator in the present embodiment. Furthermore, FIG. 12 is a top view schematically illustrating the sensing ranges of the environmental obstacle sensors. In the diagrams, a component similar to that of the first embodiment is given the same numeral and description thereof is omitted.

Figure 12:
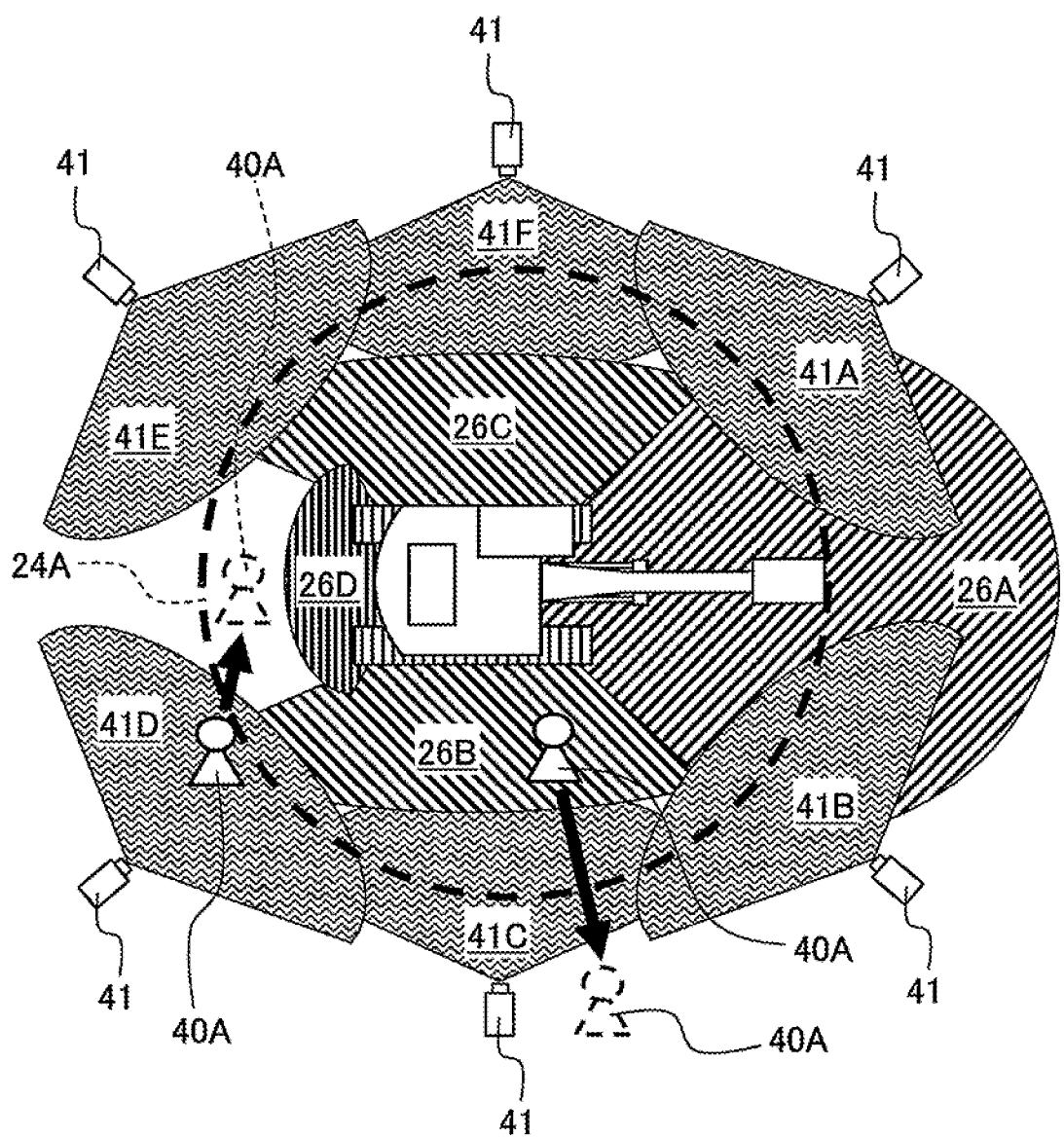
FIG. 12 is a top view schematically illustrating sensing ranges of environmental obstacle sensors.

As illustrated in FIG. 11 and FIG. 12, plural (for example six) environmental obstacle sensors 41 that sense an object around the machine body (upper swing structure 22, lower track structure 20) are disposed around the hydraulic excavator 100. The environmental obstacle sensors 41 are installed mainly for the purpose of reducing the blind area in the movable range 24A of the hydraulic excavator 100. The installation positions and the number of environmental obstacle sensors 41 are not particularly limited to the example of the present embodiment. The environmental obstacle sensors 41 are sensors, cameras, or the like that have a tripod or the like and use a LiDAR (Laser Imaging Detection and Ranging, laser image detection and ranging) technique of a self-standing type for example, and sense an object that exists around the hydraulic excavator 100 and transmit coordinate data thereof to the controller 44.

In the present embodiment, the environmental obstacle sensors 41 transmit the position of the sensed obstacle 37 (moving object 40A), the sensing time, and the sensed orientation to the controller 44. In each of the type determining section 54, the movement direction determining section 55, and the detected-information recording section 56, information with higher reliability of the obstacle 37 (moving object 40A) sensed by the on-machine obstacle sensors 26 and the environmental obstacle sensors 41 are preferentially used and determination and recording are carried out.

The environmental obstacle sensors 41 are not affected by operation of the hydraulic excavator 100 and therefore can always monitor the obstacle 37 (moving object 40A) in sensing ranges 41A to 41F. Thus, the position of the obstacle 37 (moving object 40A) can be sensed in a wider range. For example, when it is possible to sense the whole thing in the movable range 24A of the hydraulic excavator 100 by the on-machine obstacle sensors 26 and the environmental obstacle sensors 41, the obstacle deleting section 58 immediately deletes all of the existence probability of the obstacles 37 (moving objects 40A) outside the movable range 24A.

The present embodiment is the same as the first embodiment regarding the other configurations.

Effects similar to those of the first embodiment can be obtained also in the present embodiment configured as above.

Third Embodiment

A third embodiment of the present invention will be described with reference to FIG. 13.

The present embodiment is what illustrates the case in which for example a work machine of a wheeled type, such as a wheel loader, is used as the work machine.

Figure 13:
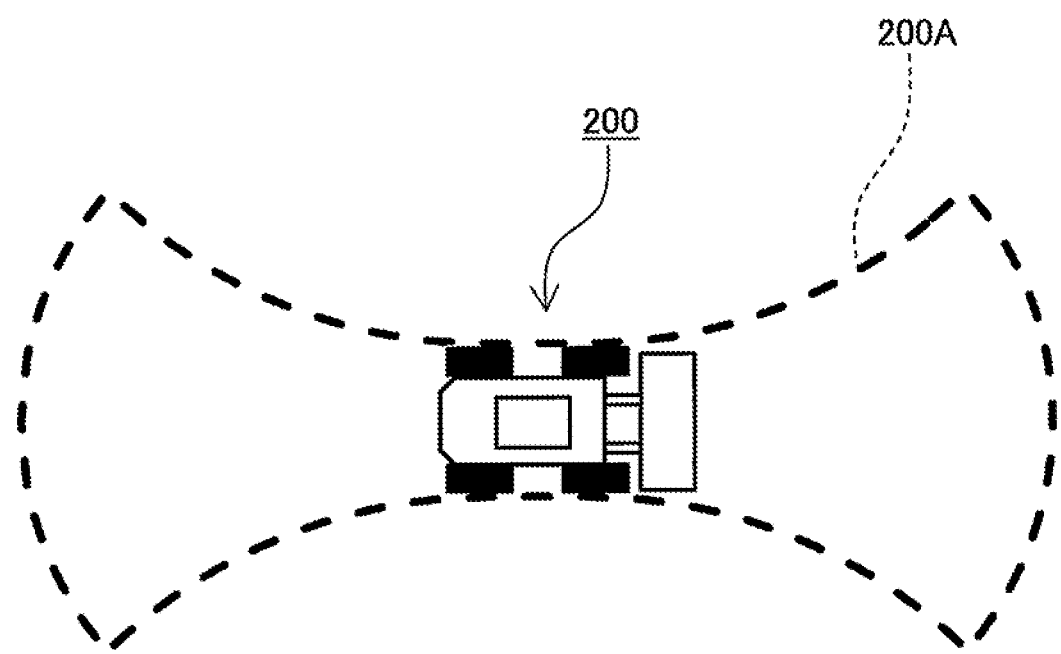
FIG. 13 is a diagram illustrating the movable range of a wheel loader that is a work machine according to a third embodiment.

FIG. 13 is a diagram illustrating the movable range of the wheel loader that is the work machine.

In FIG. 13, a movable range 200A of a wheel loader 200 is a range in which the wheel loader 200 can move in the forward-rearward direction in T seconds in the state in which a steering wheel is turned left or right to the limit.

The other configurations are the same as the first and second embodiments.

Effects similar to those of the first and second embodiments can be obtained also in the present embodiment configured as above.

Additional Notes

The present invention is not limited to the above-described embodiments and various modification examples and combinations in such a range as not to depart from the gist thereof are included. Furthermore, the present invention is not limited to what include all configurations described in the above-described embodiments and what are obtained by deleting part of the configurations are also included. Moreover, the above-described respective configurations, functions, and so forth may be implemented through designing part or all of them by an integrated circuit for example, or the like. In addition, the above-described respective configurations, functions, and so forth may be implemented by software through interpreting and executing, by a processor, a program that implements the respective functions.

DESCRIPTION OF REFERENCE CHARACTERS

2: Cab
2a, 2b: Operation lever (operation device)
3: Travelling motor
5: Boom cylinder
6: Arm cylinder
7: Bucket cylinder
8: Boom
9: Arm
10: Bucket
20: Lower track structure
20A: Movable range
21: Swing mechanism
22: Upper swing structure
23: Swing motor
24: Front work implement
26: On-machine obstacle sensor
26A to 26D: Sensing range
27: Machine body swing angle sensor
34A to 34C: Posture sensor
35: Posture information sensor
37: Obstacle
38: Rocking center
39: Fixed object
40A: Moving object
41: Environmental obstacle sensor 41A to 41F: Sensing range
44: Controller
51: Map creating section
52: Map recording section
53: Route determining section
54: Type determining section
55: Movement direction determining section
56: Detected-information recording section
57: Operation direction computing section
58: Obstacle deleting section
100: Hydraulic excavator
100A: Movable range
200: Wheel loader
200A: Movable range

The invention claimed is:

1. A work machine comprising:
a machine body having a moving device;
a work device disposed on the machine body;
a plurality of actuators that cause the moving device and the work device to operate;
an object sensor that senses an object around the machine body; and
a controller configured to:
create an environment map including information relating to an object that exists around the machine body on a basis of information on an object sensed by the object sensor and cause the plurality of actuators to operate on a basis of the environment map created,
determine a type of the object and predict a movement direction of the object on a basis of a sensing result of the object sensed by the object sensor, and
delete, from the environment map, the information relating to the object that is the object sensed by the object sensor and has been determined to have moved to outside of a sensing range of the object sensor on a basis of the type and the movement direction of the object, and
keep, in the environment map, the information relating to the object that is an object that has been sensed in a movable range of the machine body and the work device by the object sensor and whose type has been discriminated as a fixed object, and has been determined to have moved to the outside of the sensing range of the object sensor due to operation of the machine body and the work device.

2. A work machine comprising:
a machine body having a moving device;
a work device disposed on the machine body;
a plurality of actuators that cause the moving device and the work device to operate;
an object sensor that senses an object around the machine body; and
a controller configured to create an environment map including information relating to an object that exists around the machine body on a basis of information on an object sensed by the object sensor and cause the plurality of actuators to operate on a basis of the environment map created,
wherein the information relating to the object, the information being included in the environment map, includes an existence probability at a sensing position of the object, the existence probability being defined according to reliability of sensing by the object sensor, and
wherein the controller is configured to:
determine a type of the object and predict a movement direction of the object on a basis of a sensing result of the object sensed by the object sensor,
delete, from the environment map, the information relating to the object that is the object sensed by the object sensor and has been determined to have moved to outside of a sensing range of the object sensor on a basis of the type and the movement direction of the object, and
hold, for a certain time defined in advance, the information relating to the object in the environment map that is an object that has been sensed in the movable range of the machine body and the work device by the object sensor and whose type has been discriminated as a moving object, and has moved to the outside of the sensing range of the object sensor due to operation of the machine body and the work device, and thereafter gradually decrease the existence probability.

3. The work machine according to claim 2,
wherein the controller is configured to cause a holding time of the information relating to the object in the environment map to be shorter and cause a decrease speed of the existence probability to be faster when the existence probability of the object when the object is sensed by the object sensor is lower.

4. The work machine according to claim 2,
wherein the controller is configured to cause a holding time of the information relating to the object in the environment map to be shorter and cause a decrease speed of an existence probability to be faster when a distance to the object sensed by the object sensor from the machine body and the work device is longer.

5. The work machine according to claim 2,
wherein the controller is configured to cause a holding time of the information relating to the object in the environment map to be longer and cause a decrease speed of an existence probability to be slower when a movement speed of the object sensed by the object sensor is faster.

* * * * *